(12) United States Patent
Tzelepis et al.

(10) Patent No.: US 8,049,674 B2
(45) Date of Patent: Nov. 1, 2011

(54) WIDE BAND TRACKING MODULATOR

(75) Inventors: Christ P. Tzelepis, Redondo Beach, CA (US); Paul J. Tatomir, Fallbrook, CA (US)

(73) Assignee: The Boeing Company, Chicago, IL (US)

( * ) Notice: Subject to any disclaimer, the term of this patent is extended or adjusted under 35 U.S.C. 154(b) by 727 days.

(21) Appl. No.: 12/130,683

(22) Filed: May 30, 2008

(65) Prior Publication Data

US 2009/0295661 A1    Dec. 3, 2009

(51) Int. Cl.
*H01Q 13/00* (2006.01)
(52) U.S. Cl. ......................................... 343/786; 343/772
(58) Field of Classification Search .................. 343/772, 343/786
See application file for complete search history.

(56) References Cited

U.S. PATENT DOCUMENTS 3,530,471 A * 9/1970 Mark ............................ 342/425
5,617,108 A    4/1997 Silinsky et al.

FOREIGN PATENT DOCUMENTS

GB    2137428 A  * 10/1984

OTHER PUBLICATIONS

Hawkins et al.; "Tracking systems for Satellite Communications"; IEEE Proceedings; vol. 135, PL. F. No. 5; Oct. 1988.
Choung, et al.; "Theory and Design of a Ku-Band $TE_{21}$-Mode Coupler"; IEEE Transactions on Microwave Theory and Techniques; vol. 82, Issue 11; Nov. 1982 pp. 1862-1866.

* cited by examiner

*Primary Examiner* — Dieu H Duong
(74) *Attorney, Agent, or Firm* — Yee & Associates, P.C.

(57) ABSTRACT

A wide band antenna tracking modulator and method is disclosed. The system includes a common port for receiving an electromagnetic signal, a waveguide connected to the common port, at least a pair of side arms and a pair of coupling slots separated along an axis of the waveguide coupling the electromagnetic signals between the waveguide and the pair of side arms. The pair of coupling slots substantially coupled a higher order TE mode signal while substantially not coupling a primary TE mode signal. The method includes substantially coupling a higher order Transverse Electric (TE) mode signal of the electromagnetic signal while substantially not coupling a primary TE mode signal of the electromagnetic signal to at least a pair of side arms coupled to the wave guide though a pair of coupling slots separated along the axis of the waveguide.

19 Claims, 4 Drawing Sheets

WIDE BAND TRACKING MODULATOR

CROSS REFERENCE TO RELATED APPLICATIONS

NONE

BACKGROUND

1. Field of the Disclosure

This disclosure is related to antenna systems; specifically to a wide band antenna tracking systems.

2. Related Art

High gain antennas provide highly directional beams. While these antenna can provided high receive sensitivity, pointing of the antenna to the incoming electromagnetic wave is critical in maintaining this sensitivity. This is especially critical in space applications where pointing errors can seriously degrade system performance.

For any mode of transmission of a microwave signal in a circular waveguide, the electric and magnetic transverse fields may each be resolved into a respective set of tangential and radial components. Those skilled in the art of microwave theory are aware that both the tangential and radial components vary periodically in amplitude along a circular path, which is concentric with a wall of the waveguide, and also vary in amplitude along any given radius in a manner related to a Bessel function of an order m.

Modes of a transverse electric (TE) field are identified by the notation TEmn and modes of a transverse magnetic (TM) field are identified by the notation TMmn, where m represents the total number of full period variations of either the tangential or radial component of the respective electric or magnetic field along a circular path concentric with the wall of the waveguide, and n represents one more than the total number of reversals of polarity of either the tangential or the radial component of the respective electric or magnetic field along a radial path.

In a waveguide that can support more than one propagation mode, the mode that propagates with minimum degradation is designated as the dominant mode. The dominant mode in circular waveguides may be denoted as the TE11 mode, which corresponds to the TE10 mode in rectangular waveguides. In this disclosure, the term "dominant mode" and "primary mode" are used interchangeably.

Conventional antenna tracking systems today are undesirable because they are generally used in single frequency applications. For wideband, frequency applications, conventional systems use asymmetric waveguide modes such as TE21 (Transverse Electric 21) or TM01 (Transverse Magnetic 01) modal couplers. These modal couplers are heavy and use a complex waveguide network in signal combination, and hence are undesirable. Therefore, it is advantageous to have a compact wideband antenna tracking modulator for antenna based signal tracking.

SUMMARY

In one embodiment, a wide band antenna tracking modulator system is disclosed. The wide band antenna tracking modulator system includes a common port for receiving an electromagnetic signal; a centrally located waveguide connected to said port; at least a pair of side arms for coupling said electromagnetic signal; a pair of coupling slots separated along an axis of the waveguide, for coupling said electromagnetic signal between the waveguide and the pair of side arms, the pair of coupling slots configured to substantially couple a higher order TE mode signal while substantially not coupling a primary TE mode signal.

In another embodiment, a method for a wide band antenna tracking modulator system is disclosed. The method includes receiving an electromagnetic signal from a common port; coupling the electromagnetic signal to a centrally located waveguide connected to the common port; and substantially coupling a higher order TE mode signal of the electromagnetic signal while substantially not coupling a primary TE mode signal of the electromagnetic signal to at least a pair of side arms coupled to the wave guide though a pair of coupling slots separated along the axis of the waveguide.

In yet another embodiment, an antenna system is disclosed. The antenna system includes a horn for receiving electromagnetic radiation in a primary mode; a common port for receiving the electromagnetic signal from the horn; a centrally located waveguide connected to the common port; at least a pair of side arms for coupling the electromagnetic signal; a pair of coupling slots separated along an axis of the waveguide, for coupling the electromagnetic signals between the waveguide and the pair of side arms, the pair of coupling slots configured to substantially couple a higher order TE mode signal while substantially not coupling primary TE mode signal.

This brief summary has been provided so that the nature of the disclosure may be understood quickly. A more complete understanding of the disclosure may be obtained by reference to the following detailed description of embodiments, thereof in connection with the attached drawings.

BRIEF DESCRIPTION OF THE DRAWINGS

The foregoing features and other features of the present disclosure will now be described with reference to the drawings. In the drawings, the same components have the same reference numerals. The illustrated embodiments are intended to illustrate, but not to limit the disclosure. The drawings include the following figures.

DETAILED DESCRIPTION

In one embodiment, a compact antenna tracking modulator for an antenna tracking system is provided to track a signal over a wide frequency range. The modulator includes a common port that receives a signal in the TE21 mode. The common port is coupled to a plurality of side arms that include a filter like structure, where in conjunction with the spacing of a plurality of coupling slots, the TE11 mode is controlled. The slot spacing and the filter like structure, described below, minimizes coupling of the TE21 mode into the side arms.

Figure 1:
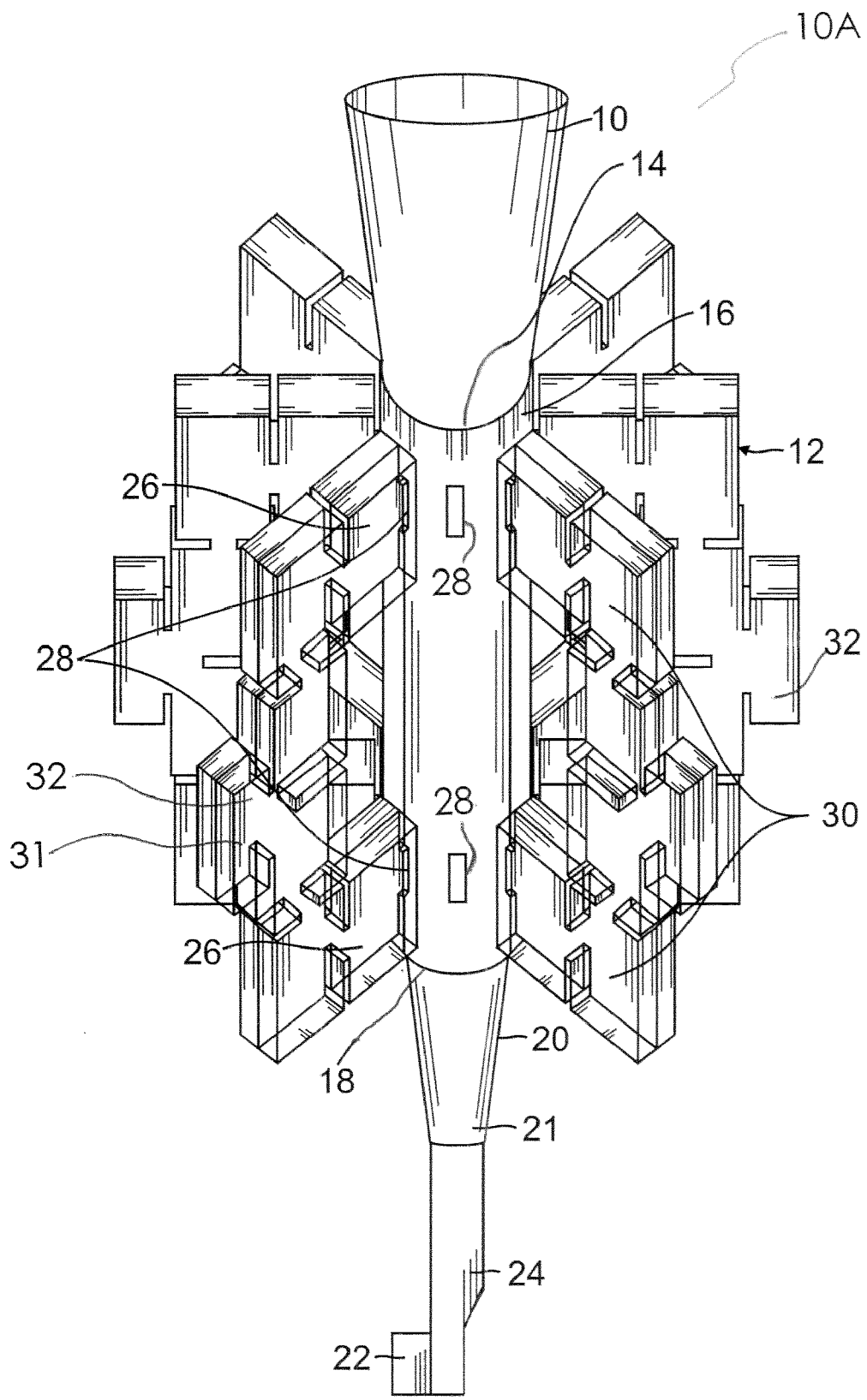
FIG. 1 is a perspective view of a wideband antenna tracking modulator, according to the present disclosure.

FIG. 1 is a perspective view of a tracking feed horn antenna system 10A with a modulator 12, according to one embodiment of the present disclosure. The auto-tracking feed antenna depicted in FIG. 1 is intended for use with electromagnetic radiation preferably in the microwave band, and has a horn 10 for receiving incoming signals. The horn feeds into a modulator 12 via a common port 14 of a cylindrically shaped circular waveguide section 16. The output port 18 feeds into a mode filter 20.

The mode filter 20 feeds into a polarizer 21 and an orthomode transducer 22. The latter two elements separate the two senses of circular polarization, left and right, into two different channels. A circular to rectangular transducer 24 allows received signals in the two senses to be carried to a signal processing equipment (not shown) through different rectangular waveguides.

The modulator 12 further includes at least a pair of side arms 26. The pair of side arms 26 is coupled to the waveguide 16 by a pair of coupling slots 28, to couple the electromagnetic signal between the waveguide 16 and the pair of side arms 26. For example modulator 12 as shown in FIG. 1 may have eight pairs of side arms 26. FIG. 1 is shown with one pair of side arms removed to better show the features of the other side arms 26, while showing the coupling slots 28 for the removed side arms. Another pair of side arms may be present on the other side of waveguide 16, radially separated from the removed side arms by about 180 degrees. This pair of side arms although not visible in this view, is partially visible in FIG. 2.

In one embodiment, the pair of coupling slots 28 is configured to couple electromagnetic signals between the waveguide 16 and the pair of side arms 26 to substantially couple a higher order TE mode signal while substantially not coupling a primary TE mode signal.

In yet another embodiment, the size of the pair of coupling slots 28 is configured to substantially couple a higher order TE mode signal while substantially not coupling a primary TE mode signal.

In yet another embodiment, the pair of coupling slots 28 is separated by a distance along the axis of the waveguide 16 to substantially couple a higher order TE mode signal while substantially not coupling a primary TE mode signal. In one embodiment, the distance between the pair of coupling slots 28 may be configured to be between ½ and ¾, of the wavelength of the electromagnetic signal.

In one embodiment, the primary TE mode signal may be be a TE11 mode signal. In one embodiment, the higher order TE mode signal may be a TE21 mode signal.

In one embodiment, the amount of higher order TE mode signal, for example, TE21 mode signal coupled to the side arms 26 may be selected based upon the capabilities of a control system 50 (FIG. 2) of the tracking system for changing antenna positions. For example, an optimal amount of TE21 mode signal may be coupled to the side arms 26 to prevent saturation of the control system electronics.

In yet another embodiment, the location of the coupling slots 28 may be placed proximate to the location where maximum standing waves of a TE21 mode signal is present in the waveguide 16.

Each of the side arms 26 are coupled to a filter structure 30 to filter out any primary TE mode signal coupled to the side arms 26. The side arms 26 are further coupled to a phase shifter 31 to shift the phase of the coupled signal. A terminator 32 is used to terminate the phase shifter.

In one embodiment, the phase shifter 31 shifts the phase of the coupled higher order TE mode signal by 90 degrees. In yet another embodiment, the phase shifter 31 shifts a higher order TE21 mode signal to a primary TE11 mode signal. The converted TE11 mode signal exits out of the output port 18 of the waveguide 16. The converted TE11 mode signal is used as an input to the control system of the tracking system to change positioning of the antenna in order to minimize the amplitude of the TE21 mode signal coupled to side arms, this substantially aligns the antenna's boresight axis with the direction of the incoming signal wave front beam.

The feed antenna includes a mode filter 20 implemented, for example, by a change in waveguide diameter which precludes propagation of the TE21 mode past the modulator 12.

By having two coupling slots 28 coupling the side arms 26 to the waveguide 16, results in a wide band modal conversion. By converting the coupled TE21 mode signal in the side arms 26 into converted TE11 mode signal reduces the size and weight of the tracking modulator.

In one embodiment, a plurality of pairs of side arms 26 with associated phase shifter 31 and filter structure 30 assembly are provided in the tracking modulator 12. For example, for a linearly polarized electromagnetic signal, a tracking modulator 12 with four pairs of side arms 26 and associated phase shifter 31 and filter structure 30 may be used. For a linearly polarized electromagnetic signal, each of the two adjacent pairs of side arms 26 may be orthogonally located for optimal performance.

As one skilled in the art appreciates, a circularly polarized electromagnetic signal creates two orthogonal TE21 modes in the small end of the horn, and tracking system 10A would loose some accuracy if only one of these two modes are coupled and processed, as would happen with a system with four pairs of side arms 26 that are orthogonally placed with each other. For better tracking performance, for a circularly polarized electromagnetic signal, a tracking modulator 12 with eight pairs of side arms and associated phase shifter 31 and filter structure 30 may be used. In this configuration, it is preferable to have two alternating adjacent pairs of side arms 26 that are orthogonally located to each other, for optimal performance.

While the beam switching arms 26 have been described as sections of rectangular waveguide, any generalized transmission lines with some sort of phase switching mechanism can be used. Depending on the frequency at which the feed is to operate, alternative waveguide types include Stripline, Microwave integrated circuits or Finline.

As one skilled in the art appreciates, the phase switching function can be performed with PIN diodes, ferrite switches or Finlines. For example, U.S. Pat. No. 5,617,108 describes the use of PIN diodes, ferrite switches or Finlines to achieve phase switching functions for use with side arms.

Figure 2:
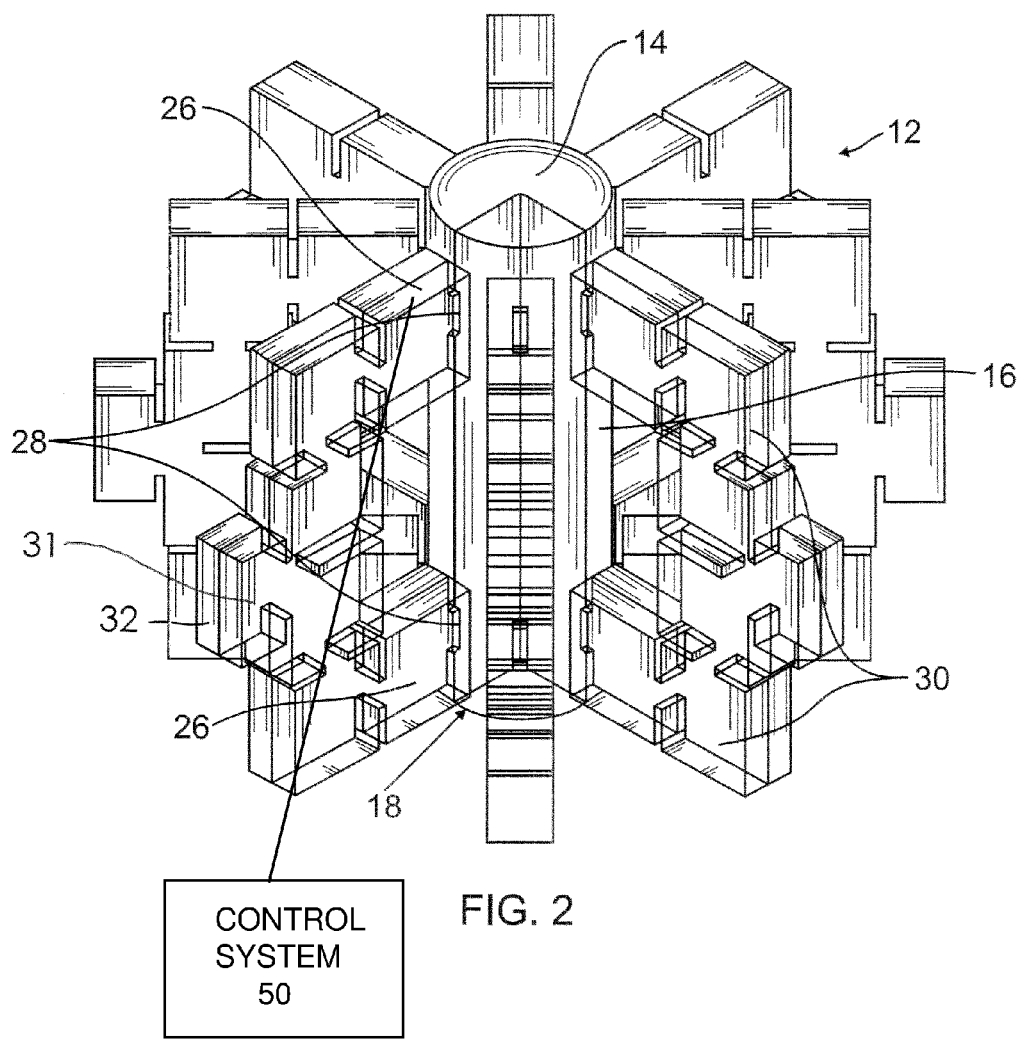
FIG. 2 is an exploded perspective of substantial portion of the modulator showing a plurality of pairs of side arms, according to an embodiment of the present disclosure.

FIG. 2 is an exploded perspective of substantial portion of the modulator 12 showing a plurality of pairs of side arms 26 according to an embodiment of the present disclosure. For example, FIG. 2 shows an exploded perspective of the modulator 12 with eight pairs of side arms (with one of the pairs of side arms cut away to better show the side arms 26 and the inside of the waveguide 16). The modulator 12 includes a plurality of pairs of side arms 26. Each of the plurality of pairs of side arms 26 are coupled to the waveguide 16 by a pair of coupling slots 28, to couple the electromagnetic signal between the waveguide 16 and the pairs of side arms 26. For brevity, the description of various parts of the modulator 12 is not repeated here, as they have been previously described in detail with respect to FIG. 1.

Figure 3:
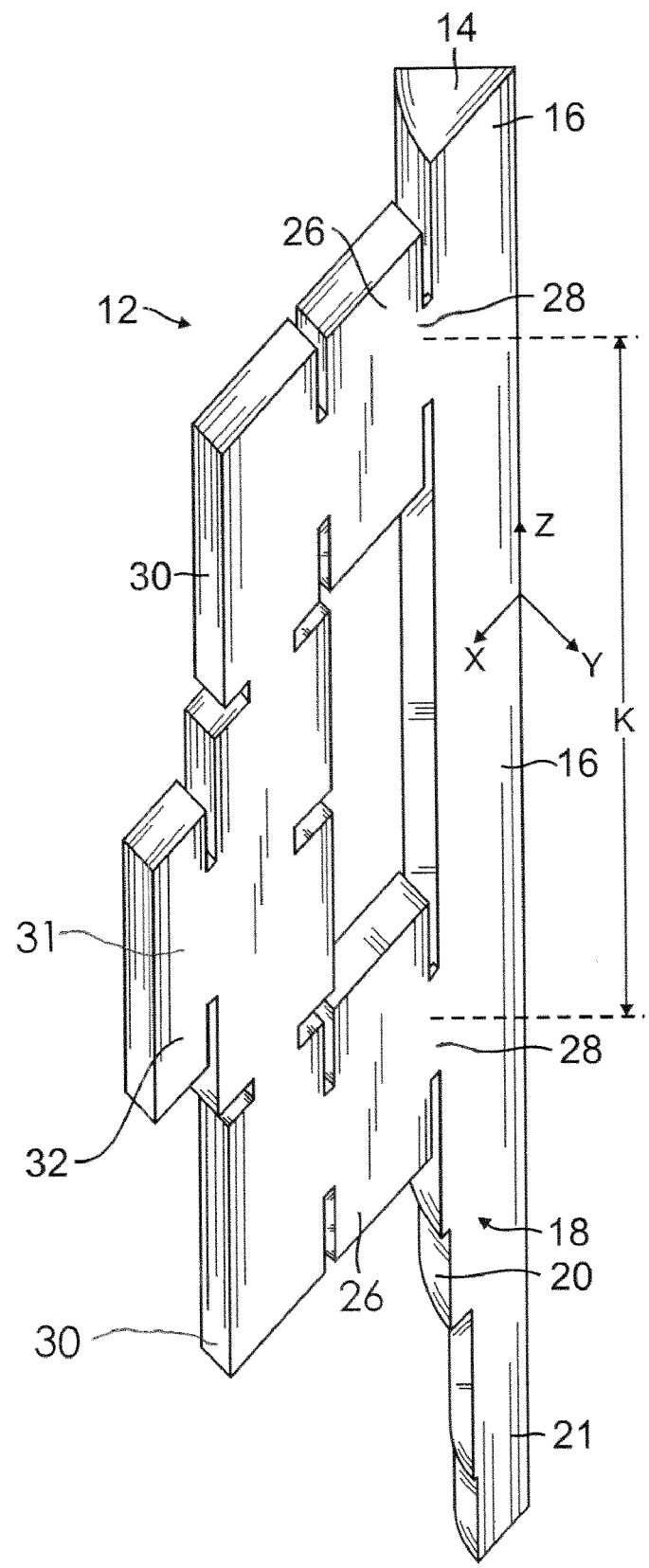
FIG. 3 is an exploded perspective of a pair of side arms, according to an embodiment of the present disclosure.

FIG. 3 is an exploded perspective of a pair of side arms according to an embodiment of the present disclosure. FIG. 3 shows a cutout of a pair of side arms 26 of the modulator 12, along with the coupling slots 28, filter 30, phase shifter 31 and phase shift termination 32. FIG. 3 also shows portion of the common port 14, waveguide 16, output port 18, mode filter 20 and polarizer 21. For brevity, the description of various parts of the modulator 12 is not repeated here, as they have been previously described in detail with respect to FIG. 1.

In one embodiment, the coupling slots 28 are separated by a distance k, along the Z axis and the side arms 26 are located perpendicular to the Z axis, for example, along the X axis. The size of the coupling slots 28 and the distance between the coupling slots 28 are selectively chosen as previously disclosed with respect to FIG. 1. The Z axis, for example may represent the boresight axis of the antenna.

Figure 4:
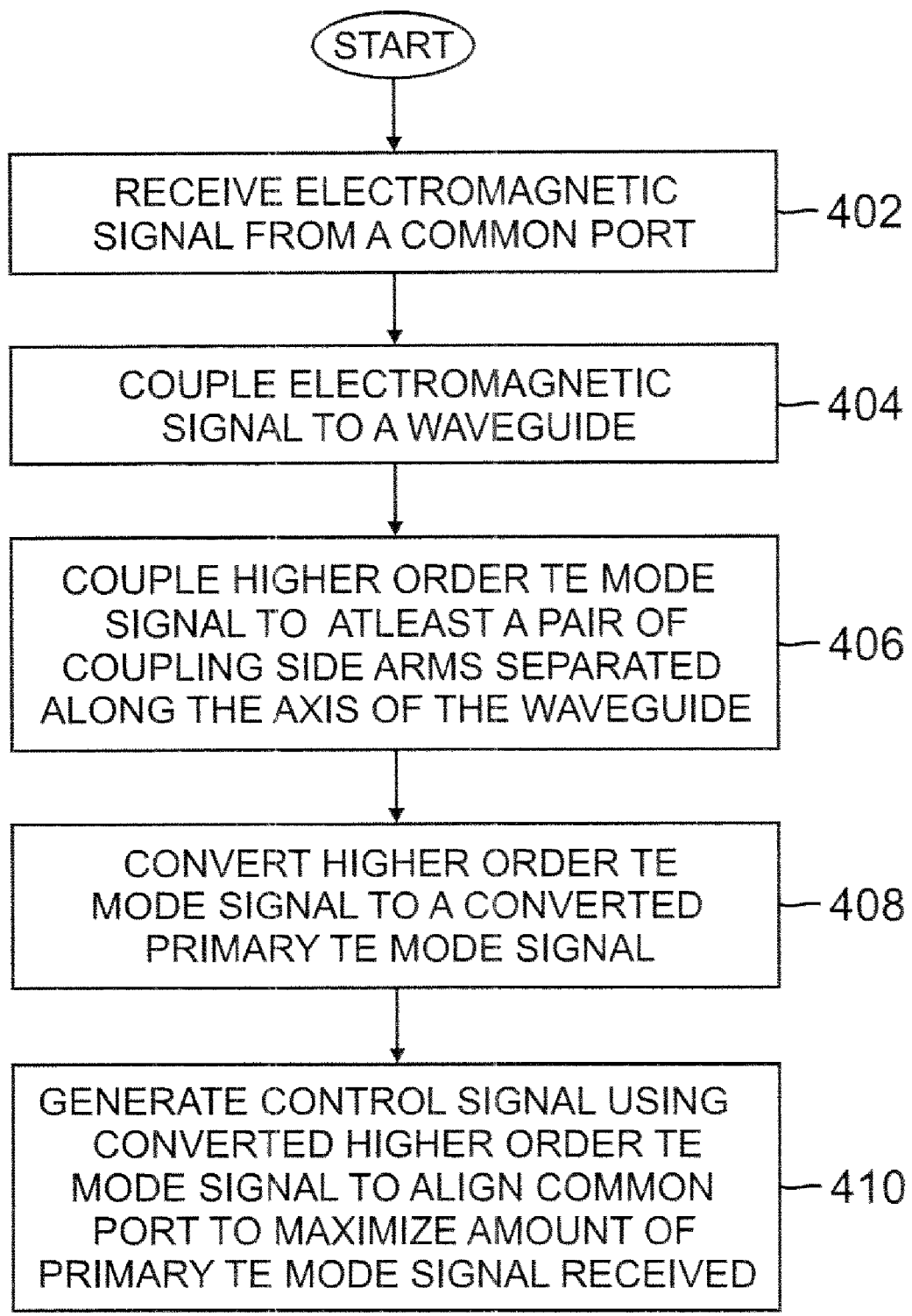
FIG. 4 is a flow chart showing the method of tracking a wide band antenna system, according to an embodiment of the present disclosure.

Now referring to FIG. 4, the method of tracking a wide band antenna system according to an embodiment of the current disclosure is disclosed.

In step 402, the electromagnetic signal from a common port is received. In step 404, the electromagnetic signal is coupled to a centrally located waveguide connected to the common port.

In step 406, a higher order TE mode signal of the electromagnetic signal is substantially coupled to at least a pair of side arms coupled to the wave guide through a pair of coupling slots separated along the axis of the waveguide, while substantially not coupling the primary TE mode signal of the electromagnetic signal.

In step 408, the higher order TE mode signal is converted into a converted primary TE mode signal, by shifting the phase of the higher order TE mode signal.

In step 410, the converted primary TE mode signal is fed to a control system and a control signal is generated to align the common port to maximize the amount of primary TE mode signal received and minimize the amount of higher order TE mode signal received.

In one embodiment, the primary TE mode signal is a TE11 mode signal. In one embodiment, the higher order TE mode signal is a TE21 mode signal. In one embodiment, the electromagnetic signal is circularly polarized, the primary TE mode signal is a TE11 circularly polarized modal signal and the higher order TE mode signal is a TE21 circularly polarized modal signal.

In another embodiment, the wide band antenna tracking modulator disclosed herein may be used in an autotracking antenna wherein the antenna tracking modulator receives an electromagnetic signal that is circularly polarized and converts the TE21 circularly polarized modal signal to TE11 circularly polarized modal signal.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A wide band antenna tracking modulator system comprising:
   a common port for receiving an electromagnetic signal;
   a centrally located waveguide connected to said port;
   at least eight side arms for coupling said electromagnetic signal;
   at least eight slots separated along an axis of the waveguide, for coupling said electromagnetic signal between said waveguide and the side arms, the coupling slots configured to substantially couple a higher order Transverse Electric (TE) mode signal while substantially not coupling a primary TE mode signal,
   wherein each of the side arms includes a phase shifter to shift a phase of the higher order TE mode electromagnetic signal coupled to the side arm; and
   wherein the phase shifter shifts the phase of the higher order TE mode electromagnetic signal by substantially 90 degrees to create a converted primary TE mode of the electromagnetic signal.

2. The system of claim 1, wherein a size of the pair of coupling slots are configured to substantially couple the higher order TE mode signal while substantially not coupling the primary TE mode signal.

3. The system of claim 1, wherein the pair of coupling slots are separated by a distance along the axis of the waveguide to substantially couple the higher order TE mode signal while substantially not coupling the primary TE mode signal.

4. The system of claim 3, wherein the distance between the pair of coupling slots is configured to be between about ½ and about ¾ of a wavelength of said electromagnetic signal.

5. The system of claim 1, further comprising:
   a plurality of pairs of side arms, each of said pairs of side arms having a corresponding pair of side arms that are orthogonally positioned to each other along a plane substantially perpendicular to an axis of the waveguide.

6. The system of claim 1, wherein the side arm includes a filter structure to filter out a primary TE mode signal of the electromagnetic signal.

7. The system of claim 1, wherein the primary TE mode of the electromagnetic signal is TE11 mode.

8. The system of claim 1, wherein the first higher order mode of the electromagnetic signal is TE21 mode.

9. The system of claim 1, wherein the converted primary TE mode signal is coupled to an output port of the waveguide.

10. The system of claim 9 further comprising:
    a mode filter coupled to the output port of the waveguide to substantially filter out first higher order mode signal of the electromagnetic signal.

11. The system of claim 1, wherein the electromagnetic signal is circularly polarized, the higher order TE mode electromagnetic signal is a TE21 circularly polarized modal signal and the converted primary TE mode of the electromagnetic signal is a TE11 circularly polarized modal signal.

12. A method for a wide band antenna system, comprising:
    receiving an electromagnetic signal from a common port;
    coupling the electromagnetic signal to a centrally located waveguide connected to said common port;
    substantially coupling a higher order Transverse Electric (TE) mode signal of the electromagnetic signal while substantially not coupling a primary TE mode signal of the electromagnetic signal to at least eight side arms coupled to the wave guide though at least eight slots separated along an axis of the waveguide; and
    phase shifting, through a phase shifter on each of the side arms, a phase of a higher order TE mode electromagnetic signal coupled to the side arm, thereby creating a converted primary TE mode signal, wherein the phase shifting of the higher order TE electromagnetic signal is substantially 90 degrees.

13. The method of claim 12, further comprising:
    feeding the converted primary TE mode signal to a control system and generating a control signal to align the common port to maximize an amount of primary TE mode signal received and minimize an amount of first higher order TE mode signal received.

14. The method of claim 12, wherein the electromagnetic signal is circularly polarized, the higher order TE mode electromagnetic signal is a TE21 circularly polarized modal signal and the converted primary TE mode signal of the electromagnetic signal is a TE11 circularly polarized modal signal.

15. The method of claim 12 further comprising the step of spacing a pair of coupling slots separated by a distance along the axis of the waveguide to substantially couple the higher order Transverse Electric (TE) mode signal of the electromagnetic signal while substantially not coupling a primary TE mode signal of the electromagnetic signal.

16. The method of claim 15 wherein the distance between the pair of coupling slots is configured to be between about ½ and about ¾ of a wavelength of said electromagnetic signal.

17. An antenna system, comprising:
a horn for receiving electromagnetic radiation in a primary mode;
a common port for receiving an electromagnetic signal from the horn;
a centrally located waveguide connected to the common port;
at least eight side arms for coupling the electromagnetic signal;
at least eight slots separated along an axis of the waveguide, for
coupling the electromagnetic signal between said waveguide and the side arms, the coupling slots configured to substantially couple a higher order TE mode signal while substantially not coupling a primary TE mode signal
wherein each of the side arms includes a phase shifter to shift a phase of the higher order TE mode electromagnetic signal coupled to the side arm; and
wherein the phase shifter shifts the phase of the higher order TE mode electromagnetic signal by substantially 90 degrees to create a converted primary TE mode of the electromagnetic signal.

18. The antenna system of claim 17, further including a control system to receive the converted primary TE mode signal and for generating a control signal to align the common port to maximize an amount of a primary TE mode signal received and minimize an amount of first higher order TE mode signal received.

19. The antenna system of claim 17, wherein the electromagnetic signal is circularly polarized, the higher order TE mode electromagnetic signal is a TE21 circularly polarized modal signal and the converted primary TE mode of the electromagnetic signal is a TE11 circularly polarized modal signal; and the system is a auto-tracking antenna system.

* * * * *